Dec. 20, 1927.
T. B. KELLY
FARM IMPLEMENT
Filed Aug. 28, 1926
1,653,292
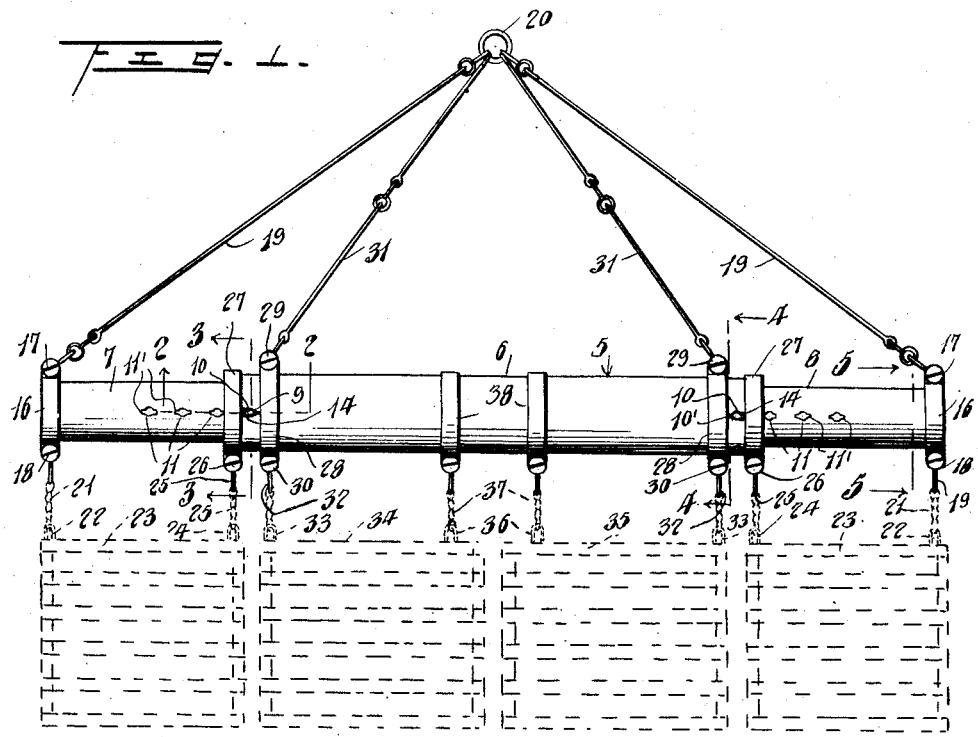
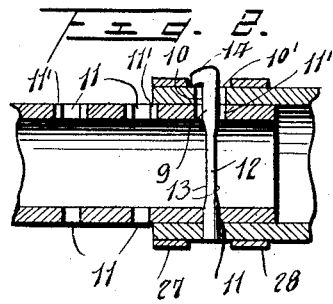
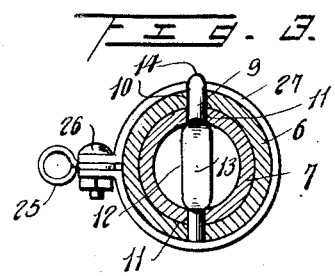
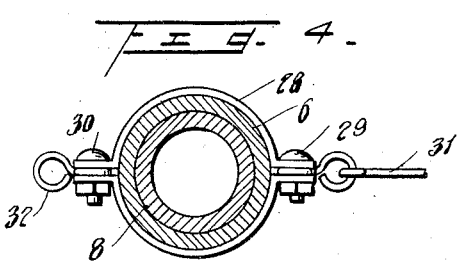
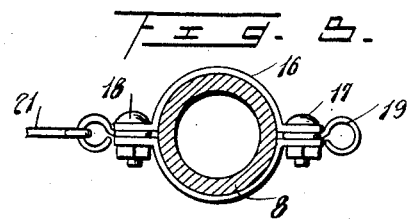
Inventor
Thomas B. Kelly
By
Attorney Patented Dec. 20, 1927.

1,653,292

UNITED STATES PATENT OFFICE.

THOMAS B. KELLY, OF IOWA CITY, IOWA.

FARM IMPLEMENT.

Application filed August 28, 1926. Serial No. 132,243.

This invention relates to farm implements and is concerned, more particularly, with the provision of improved draw bar means whereby relatively wide sectional implements such as harrows, rollers, discs, road drags and the like may be conveniently adjusted to pass through gate ways of ordinary width so that such implements may be conveniently transferred from one fenced field to another without disconnecting same from the draw bar or the draft means to which the draw bar is attached.

A further purpose of the invention is to provide a variable length draw bar adjustable to suit implements of varying width and having novel means for securing relatively movable sections of the draw bar in adjusted position.

A still further purpose of the invention is to provide novel means for securing the draw bar to the draft means and to a sectional implement in such manner that the length of the draw bar can be conveniently reduced and certain sections of the implement partly or wholly detached from portions of the draw bar and placed upon the remaining sections of the implement so as to permit the draw bar and implement to be conveniently drawn through a gateway of ordinary width.

Other purposes and advantages of the invention as well as the details of construction and arrangement of parts constituting the preferred embodiment herein disclosed will be more readily understood from the following detailed description and accompanying drawings in which, Figure 1 is a top plan view of my improved draw bar connected to a sectional harrow the sections of which are indicated by dotted lines.

Figure 2 is a fragmentary longitudinal sectional view taken along the line 2—2 of Figure 1.

Figure 3 is a transverse sectional view taken along the line 3—3 of Figure 1.

Figure 4 is a transverse sectional view taken along the line 4—4 of Figure 1, and Figure 5 is a transverse sectional view taken along the line 5—5 of Figure 1.

Proceeding now to a more detailed discussion of the drawings 5 designates a draw bar consisting of the hollow tubular sections 6, 7 and 8, the central section 6 being made of sufficient diameter to telescopically receive therein the inner ends of the outer sections 7 and 8 whereby said outer sections may be projected or retracted with respect to the central section to vary the effective length of the draw bar.

The several sections of the draw bar are secured in adjusted position by lock pins 9 passed through registering openings 10 and 11 formed respectively in the central section 6 and the outer sections 7 and 8. Preferably, the central section 6 is provided with a single opening 10 at each end while the outer sections are provided with a series of openings 11 adapted to be selectively aligned with the openings 10 in effecting the various adjustments of the sections. In order to prevent accidental displacement thereof each lock pin 9 is flattened at an intermediate point to provide projecting side wings 12 and 13 which, during insertion of the pin, are received through the lateral extensions 10' of the openings 10 and the lateral extensions 11' of the upper openings 11 of the outer sections 7 and 8. After the wings 12 and 13 of the pins have been passed through the last mentioned openings 10 and 11 to dispose the flattened portions of the pins wholly within the outer sections 7 and 8 the pins are turned axially to dispose the wings 12 and 13 between and at right angles to the aforesaid extensions 10' and 11' whereby the upper terminals of the wings abut the inner upper surfaces of the sections 7 and 8 at opposite sides of said openings to prevent displacement of the pins. Preferably the pins are bent at the upper ends to form heads 14 arranged to frictionally grip the central section 6 during the aforesaid turning of the pins.

In the present instance I have shown the draw bar as adapted for use in connection with a harrow of the multiple frame or unit type and provision is made as follows for connecting the draw bar to the draft means and to the units of the harrow. Each of the sections 7 and 8 of the draw bar is equipped at its outer end with a clamp 16 consisting of two plates receiving said sections therebetween and terminally secured together by bolts 17 and 18. The bolts 17 are attached by link connections 19 to a draft ring 20 which in turn is attached to the draft means (not shown). The bolts 18 are connected by chains 21 or other flexible connections to the outer eyes 22 of the terminal harrow frames 23. These frames are also equipped with inner eyes 24 attached by chains or other flexible connections 25 to the bolts 26 of clamps 27 carried by the outer ends of the central section 6. Inwardly of the clamp 27 section 6 is provided with additional clamps 28 corresponding exactly in structure to the first mentioned clamps 16 and including terminal securing bolts 29 and 30, the bolts 29 being connected by link means 31 to the draft ring 20 and the bolts 30 being connected by chain or flexible connections 32 to the outer eyes 33 of the intermediate harrow sections 34 and 35, the latter being both provided with inner eyes 36 connected by chains or flexible connections 37 to clamps 38 encircling the intermediate portion of section 6.

With the arrangement described in the foregoing it is manifest that the length of the draw bar and the width of the harrow may be conveniently reduced by detaching the connections 21 between the draw bar sections 7 and 8 and the outer harrow sections 23 and swinging the latter inwardly to lie upon the intermediate harrow sections 34 and 35 subsequent to which the lock pins 9 may be removed to permit the outer draw bar sections 7 and 8 to be retracted within the sections 6 to the extent necessary thereby enabling the required adjustments to be made without completely disconnecting the harrow from the draw bar or the draw bar from the draft means.

In lieu of the arrangement of clamps described in the foregoing it will be understood that the flexible connections to the draft ring and to the harrow sections or other implements that may be substituted therefor may be welded or otherwise directly secured to the sections of the draw bar.

In adapting the draw bar for use with implements of varying width it will be understood that the sections 6, 7 and 8 are adjusted to give the desired length of draw bar and then secured in adjusted position by applying the lock pins 9 as previously explained.

Having thus fully described what I now conceive to be the preferred embodiment of my invention it will be understood that various changes may be resorted to within the scope of the appended claim and that the draw bar while shown in connection with a harrow is not limited to such application but may be applied to any other implement to which it may be adapted within the spirit of the invention as herein defined.

What I claim is:

A longitudinally adjustable draw bar comprising a hollow intermediate section, outer sections slidably mounted within the intermediate sections and capable of being projected or retracted with respect to said intermediate section to thereby vary the effective length of the draw bar, means for securing said sections together in any selected position of relative adjustment, a pair of spaced clamps encircling the central portion of the intermediate section and formed to provide for the attachment of harrow units thereto, a further pair of clamps encircling the intermediate section adjacent the outer ends of said section, each of said clamps being provided at the front side of the draw bar with means for attaching the same to a draft appliance and at the rear side of the draw bar with means for attaching the same to the aforesaid harrow units and additional clamps carried by the extreme outer ends of the intermediate section and by the outer ends of the outer sections and affording a means for the attachment of further harrow units, the clamps carried by the outer ends of the outer sections being provided at the front side of the draw bar with means for attaching same to the draft appliance.

In testimony whereof I hereunto affix my signature.

THOMAS B. KELLY.